United States Patent

Rogers

[15] 3,670,834
[45] June 20, 1972

[54] VEHICLE OPERATOR WEIGHT TRANSFER ASSEMBLY

[72] Inventor: Chester D. Rogers, Olathe, Kans.
[73] Assignee: Jacobsen Manufacturing Company, Racine, Wis.
[22] Filed: Dec. 12, 1969
[21] Appl. No.: 884,588

[52] U.S. Cl. ..................180/41, 180/1 F, 280/6 H, 280/112 A, 297/314
[51] Int. Cl. .....................................B62d 37/00
[58] Field of Search ............180/41, 1, 1.5; 280/111, 112, 280/6; 297/313, 314

[56] References Cited

UNITED STATES PATENTS

| | | | |
|---|---|---|---|
| 418,677 | 1/1890 | Benesh | 297/314 |
| 1,599,941 | 9/1926 | Ammon | 297/314 X |
| 1,640,812 | 8/1927 | Ammon | 297/314 X |
| 2,489,981 | 11/1949 | Rose | 280/6 UX |
| 3,021,107 | 2/1962 | Salo | 297/314 UX |
| 3,315,934 | 4/1967 | Taylor | 297/314 X |

FOREIGN PATENTS OR APPLICATIONS

| | | | |
|---|---|---|---|
| 204,425 | 7/1959 | Austria | 297/314 |
| 715,362 | 8/1965 | Canada | 280/6 |
| 875,891 | 7/1942 | France | 180/1 |

Primary Examiner—A. Harry Levy
Attorney—Schmidt, Johnson, Hovey & Williams

[57] ABSTRACT

Increased traction on the high drive wheel of a tractor, self propelled implement or other vehicle while tilted laterally because of sloping terrain is provided by structure which permits shifting of the weight of the operator toward the high side of the vehicle. The operator's seat is held against tilting by a rigid attachment to its mount, but the mount itself is swingable about an axis disposed well below the seat and extending fore and aft of the vehicle. During tilting of the frame to which the seat mount is swingably attached, the operator's weight may be maintained in alignment with and spaced vertically above the central longitudinal axis of the vehicle by operator control of a power device which effects swinging of the seat mount. The steering wheel, instrument panel, dashboard and footrests may also be swung in one direction as a unit with the seat mount about the same single axis common thereto as the vehicle frame, its engine and its front and rear axles tilt laterally as a unit in the opposite direction.

1 Claim, 4 Drawing Figures

PATENTED JUN 20 1972 3,670,834

INVENTOR.
Chester D. Rogers
BY
Schmidt, Johnson, Hovey,
Williams & Chase
ATTORNEYS.

VEHICLE OPERATOR WEIGHT TRANSFER ASSEMBLY

It is the primary object of my present invention to avoid loss of traction by the high drive wheel and prevent increased traction on the low drive wheel of a vehicle when tilted laterally because of sloping terrain.

An important object of the instant invention is to control traction, as just above indicated, by proper shifting of the weight of the operator of the vehicle during lateral tilting.

Another important object of the present invention is to eliminate the hazard and danger of vehicle turnover while operating on sloping terrain.

Still another important object of the instant invention is to provide for operator weight shifting as above set forth while maintaining the safety of full operator control of the vehicle while tilted.

A further object of the present invention is to attain all of the advantageous results above enumerated while providing for operator comfort during tilting of the vehicle.

Figure 1:
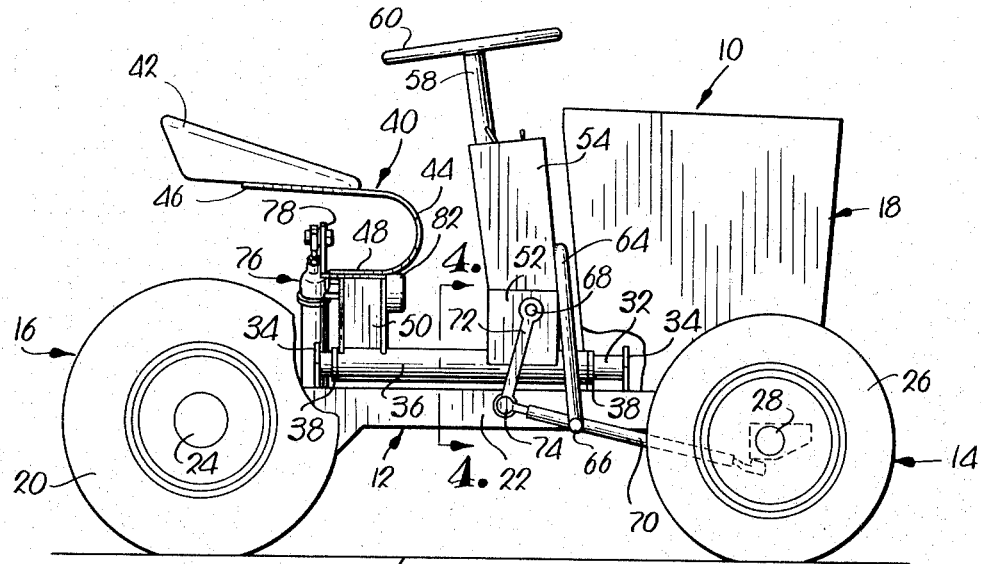
FIG. 1 is a side elevational view of a vehicle provided with an operator weight transfer assembly made pursuant to my present invention.
Figure 4:
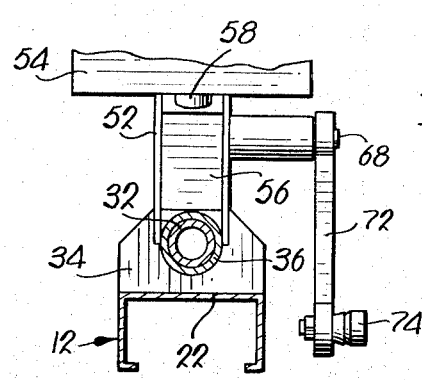
FIG. 4 is an enlarged, fragmentary, detailed cross-sectional view taken on line 4—4 of FIG. 1.

Vehicle 10 chosen in the drawing for illustrating the operator weight transfer assembly of the present invention is in the nature of a small garden tractor adapted as a towing medium or for support of mowers and other implements but it is of course understood that the concepts about to be described are not limited in their use to any particular type or size of mobile unit.

Vehicle 10 has a frame 12 that is supported by a front and a rear wheel and axle assembly broadly designated by the numerals 14 and 16 respectively. The frame 12 in turn supports an engine 18 adjacent the assembly 14 that is operably coupled with the assembly 16 in any suitable manner (not shown) for driving the wheels 20 of the latter.

Figure 3:
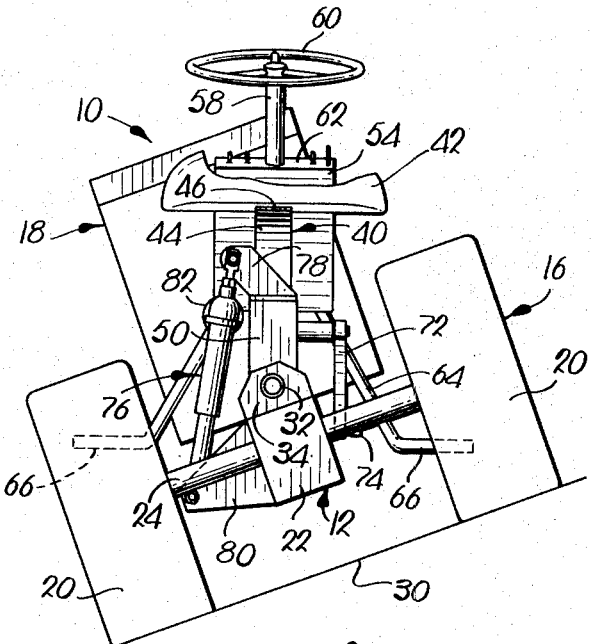
FIG. 3 is a view similar to FIG. 2 except that the tractor is shown laterally tilted.

The simplified frame 12 as illustrated includes an elongated beam 22 extending fore and aft of the vehicle 10 longitudinally thereof midway of the wheels 20, intersecting axle 24 of assembly 16, and also disposed midway between the wheels of assembly 14, one only of which is shown and designated by the numeral 26, the beam 22 also being rigid to axle 28 of assembly 14 so that the beam 22, the assemblies 14 and 16 and the engine 18 tilt laterally on sloping terrain 30 as illustrated in FIG. 3. A normally horizontal shaft 32 disposed on the central fore-and-aft longitudinal axis of the vehicle 10 forwardly of the axle 24 and rearwardly of the axle 28 is rigidly supported by the beam 22 directly thereabove by a pair of upstanding brackets 34. The shaft 32 extends through a tubular member 36 adapted to oscillate on the shaft 32 and held against fore-and-aft movement by spaced set collars 38 on the shaft 32.

A mount 40 for an operator's seat 42 includes a generally U-shaped spring 44 having a pair of vertically spaced legs 46 and 48, together with an upwardly extending pedestal 50 rigid to the member 36 adjacent the rear end of the member 36. The seat 42 rests upon the leg 46 and is rigidly secured thereto whereas the leg 48 overlies and is secured rigidly to the pedestal 50.

An upstanding bracket 52 forwardly of the pedestal 50 and rigid to the member 36 supports an upstanding dashboard 54 as well as a gearbox 56 at the lower end of a steering post 58 which carries a steering wheel 60. The dashboard 54 has a rearwardly extending instrument panel 62 at its uppermost end which is in turn secured to the post 58.

A generally U-shaped rod 64 looped over the member 36 and rigidly secured to the dashboard 54 terminates in footrests 66 below the level of member 36.

The steerable wheels 26 of the assembly 14 are operably coupled with output shaft 68 of the gearbox 56 by a linkage 70 and a crank 72 that is rigid to the shaft 68 and coupled with the linkage 70 by a universal joint 74.

Power means 76 for effecting oscillation of the member 36 pivotally interconnects brackets 78 and 80 that are in turn rigid to the pedestal 50 and the beam 22 respectively. The push-pull power device 76 chosen for illustration may, if desired, be in the form of a screw-pinion jack driven by an electric motor 82 controlled by an electric switch on the instrument panel 62, the motor 82 being of course reversible so as to oscillate the member 36 in both directions about the coincident longitudinal axes of the shaft 32 and member 36.

Figure 2:
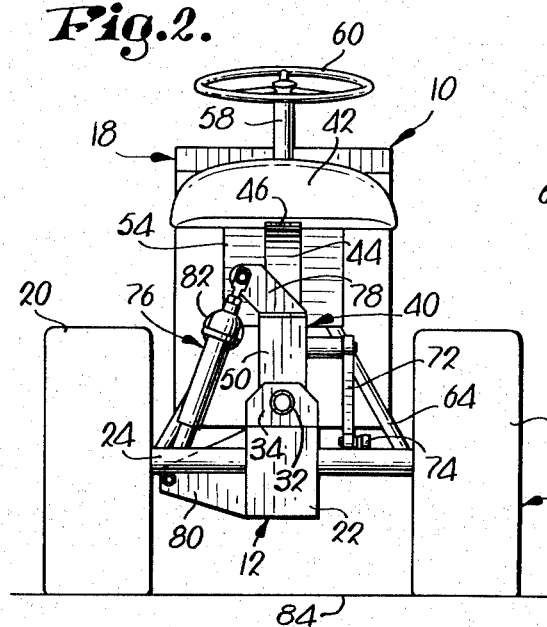
FIG. 2 is a rear elevational view of the tractor shown in FIG. 1.

The normal position of the component parts above described is as shown in FIGS. 1 and 2 when vehicle 10 is on level terrain 84. In such condition the device 76 is intermediate the ends of its reciprocable path of travel and the seat 42 is positioned directly above the shaft 32, thereby distributing the weight of the operator on seat 42 evenly on both sides of the beam 22, and therefore midway between the axles 24 and 28.

When the vehicle 10 encounters sloping terrain 30, it is but necessary for the operator to manipulate a switch on the panel 62 to energize the motor 82, thereby extending the power means 76 and rotating the member 36 clockwise viewing FIGS. 2 and 3 which is in the direction opposite to the direction of tilt of the beam 22, the assemblies 14 and 16 and the engine 18.

This swings the seat 42, the operator thereon, the mount 40, the post 58, the steering wheel 60, the footrests 66, and the crank 72 as a unit with respect to the tilted unit that includes the assemblies 14 and 16, the beam 22 and the engine 18.

Such shifting of the weight of the operator toward the higher of the two wheels 20 and away from the lower wheel 20 increases the traction of the upper wheel 20 and eliminates increased traction on the lower wheel 20. In this regard, normal tilting of operator supported vehicles increases the weight on the lower traction wheel and decreases the weight on the upper traction wheel, thereby increasing the steering problem, increasing the danger of tip-over, causing discomfort on the part of the operator, and causing a loss of power necessary to drive the vehicle.

However, as noted in FIG. 3, the operator remains upright and all of the controls remain easily accessible, thereby eliminating all danger of loss of control of the vehicle by the operator.

Therefore, under all conditions of lateral slope in the terrain over which the vehicle travels, the operator can easily and quickly make such adjustments as to maintain the seat 42 and the mount 40 directly above the shaft 32 and the position of the operator with respect to the steering wheel 60, the instrument panel 62 and the footrests 66 remains the same as in normal conditions illustrated in FIG. 2.

Such tilting, while maintaining an operable connection between steering wheel 60 and the steerable wheels 26 is made possible by the universal joint 74. If desired, other controls such as foot or hand brakes, clutches and the like may also be mounted on the oscillatory member 36 in a similar fashion.

Having thus described the invention, what is claimed as new and desired to be secured by Letters Patent is:

1. In a vehicle having a front double steering wheel and axle assembly, a rear double drive wheel and axle assembly, a frame supported by the assemblies, and an engine supported by the frame, structure for increasing the traction on the high drive wheel and decreasing the traction on the low drive wheel while the vehicle is tilted laterally because of sloping terrain, said structure comprising:

a pair of elongated, relatively telescoped members mounted on the frame above the latter and above the axles of the assemblies, and extending fore and aft of the vehicle at the transversely median axis of the latter, one of the members being rotatable about the common longitudinal axis of the members, and said axes being coincident;

an operator's seat overlying the rear axle and spaced vertically from the latter and from said axes above the level of the rear wheels;

a seat support between said one member and the seat having means rigidly securing the same to the seat and to the one member for rotation of the seat, support and the one member as a unit about said coincident axes;

power means interconnecting the support and the frame for rotating said one member in one direction when the frame, the engine and the assemblies are tilted in the opposite direction, whereby to swing said support and shift an operator on said seat laterally to a position closely adjacent the high drive wheel where the weight of the operator is supported by the high drive wheel to an appreciably greater extent than by the low drive wheel, said frame including an elongated beam parallel with said members and provided with upstanding brackets rigidly supporting the other of said members, said support including a pedestal rigidly attached to said one member and a U-shaped spring interposed between the seat and the pedestal and rigidly secured thereto;

steering mechanism between the engine and the seat operably coupled with the front assembly;

operator's controls for said power means;

foot rest means ahead of said seat; and means mounting said mechanism, said controls and said rest means on said one member for rotation therewith.

* * * * *